Figure 1:
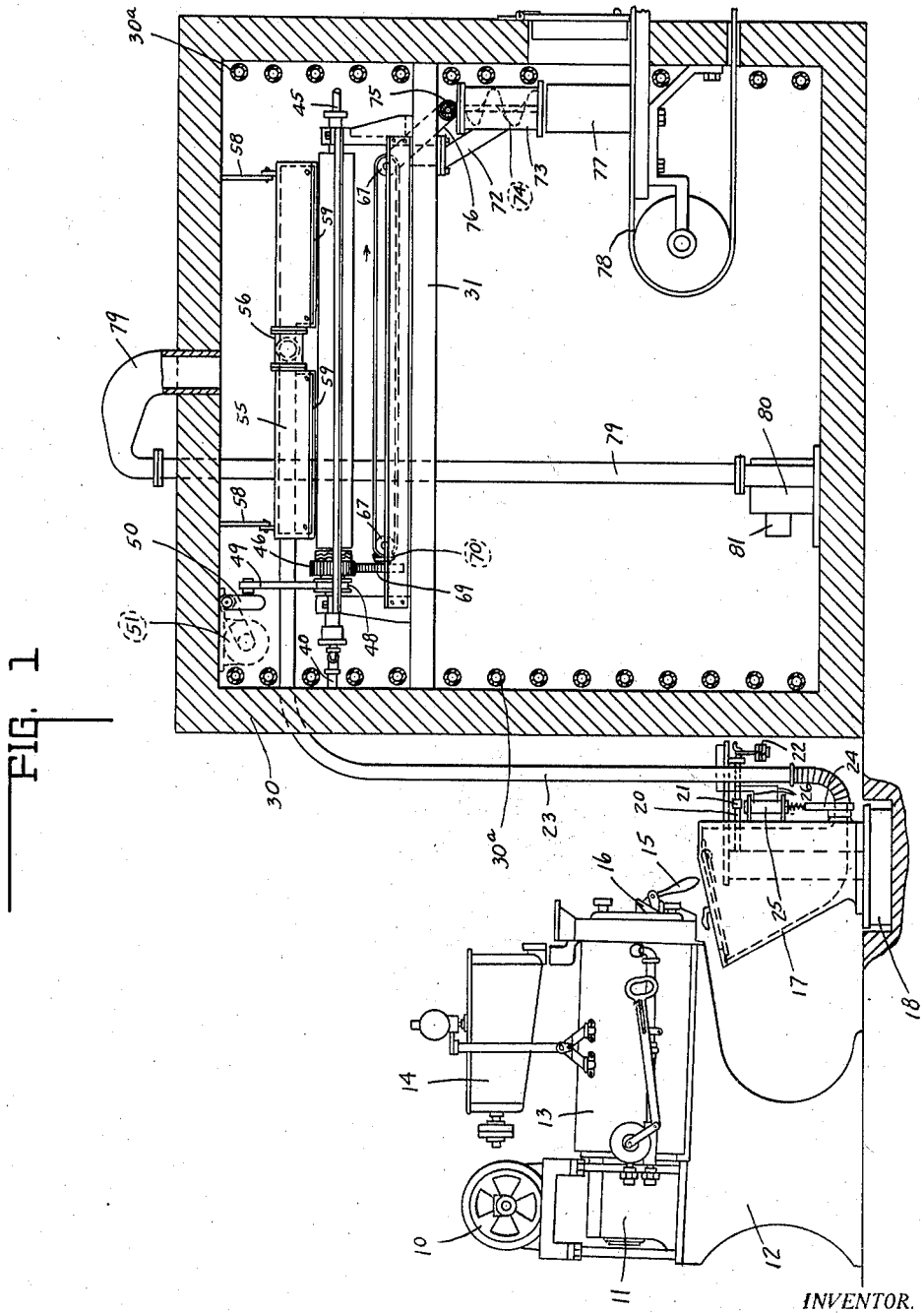

Dec. 31, 1929.  C. W. VOGT  1,742,171
PROCESS OF MANUFACTURING ICE CREAM OR THE LIKE
Original Filed Jan. 18, 1927  4 Sheets-Sheet 1

INVENTOR.
CLARENCE W. VOGT.
BY
ATTORNEYS.

Dec. 31, 1929.  C. W. VOGT  1,742,171

PROCESS OF MANUFACTURING ICE CREAM OR THE LIKE

Original Filed Jan. 18, 1927   4 Sheets-Sheet 2

INVENTOR.
CLARENCE W. VOGT.
BY
ATTORNEYS.

Dec. 31, 1929.  C. W. VOGT  1,742,171
PROCESS OF MANUFACTURING ICE CREAM OR THE LIKE

Original Filed Jan. 18, 1927    4 Sheets-Sheet 3

INVENTOR.
CLARENCE W. VOGT.
BY
ATTORNEYS.

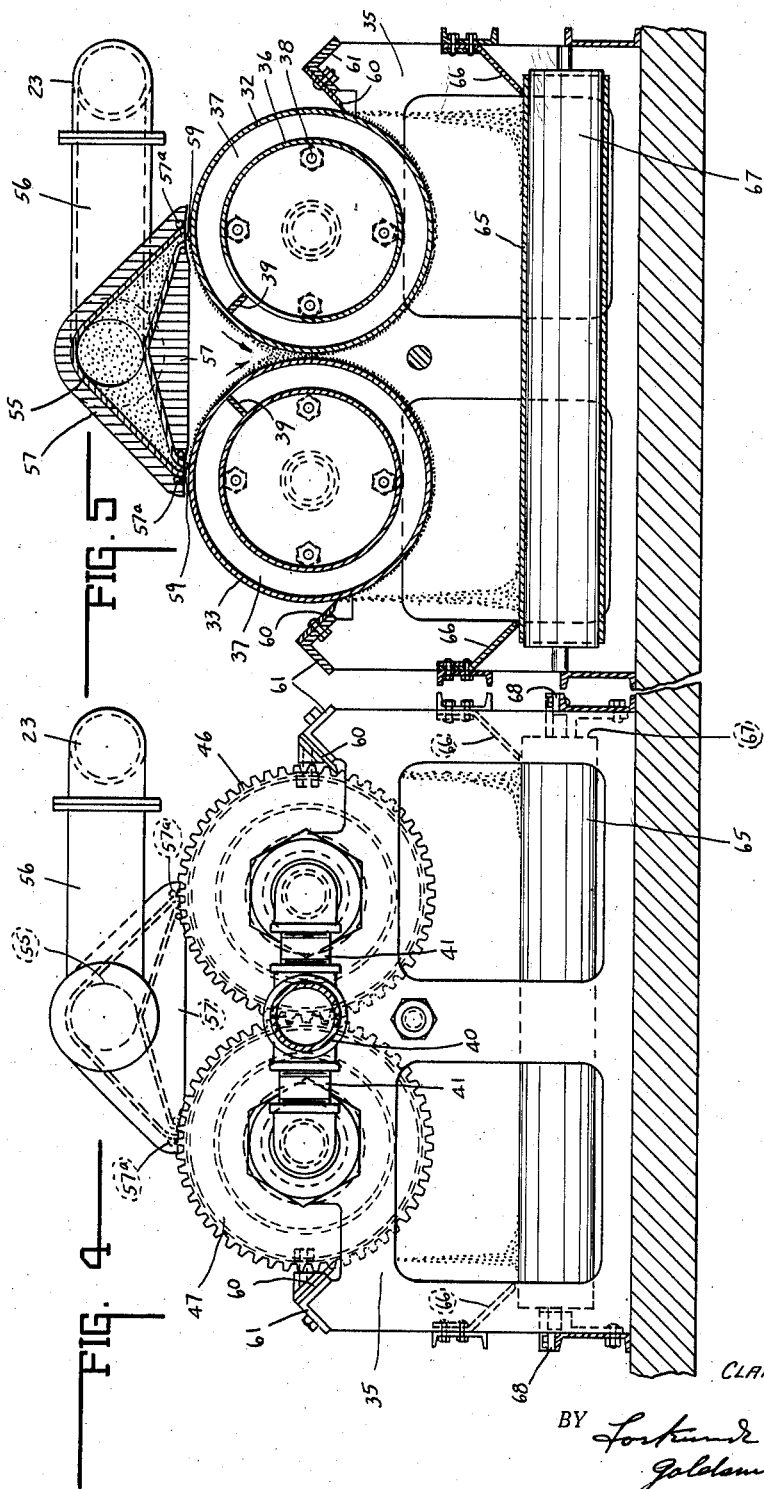

Patented Dec. 31, 1929

1,742,171

UNITED STATES PATENT OFFICE

CLARENCE W. VOGT, OF LOUISVILLE, KENTUCKY, ASSIGNOR TO VOGT INSTANT FREEZERS, INC., OF LOUISVILLE, KENTUCKY, A CORPORATION

PROCESS OF MANUFACTURING ICE CREAM OR THE LIKE

Original application filed January 18, 1927, Serial No. 161,844. Divided and this application filed January 27, 1928. Serial No. 249,907.

This invention pertains to a process for manufacturing ice cream, ices or similar frozen liquids and confections and includes the steps of aerating a material while freezing it to a semi-plastic state and then continuously passing the semi-frozen and aerated material into and through a chamber in which the same is hardened during its passage therethrough.

Certain features of the process are also applicable without the feature of aeration. In such processes the material may be first froozen to a semi-plastic state under agitation without the aeration and thereafter continually hardened as hereinafter described.

Apparatus for carrying out the said process is described and claimed in Patent 1,733,740, issued Oct. 29, 1929, on copending application Serial No. 161,844, filed January 18, 1927, of which this is a division.

Heretofore it has been customary in the manufacture of ice cream and the like to mix the same, lowering its temperature to such a degree that it will be in a semi-frozen or plastic state, and thereafter place such mixture in suitable containers, molds or the like, which are then allowed to remain standing in a freezing or hardening room until frozen to a solidified condition. This has been accomplished by the placing of such molds or containers on racks in the freezing or hardening room.

In my improved process the semi-frozen and aerated material is continuously advanced during the hardening operation. The material, instead of being in a large mass, for instance in cans or cartons, is of such thickness that during its time of travel under the influence of an intense refrigerating action it is hardened by the time it reaches the point of delivery.

One of the principal objects of this invention is to freeze the semi-frozen and plastic mixture to a substantially solid state as a continuous and rapid operation, thus eliminating the necessity for letting a semi-frozen material stand for a number of hours in a hardening room.

By this process there is considerable saving of time and handling by this more rapid means of freezing, as well as enabling the manufacture of ice cream and the like to be conducted in a continuous process and thus facilitating production.

A further important feature of the invention resides in the freezing of the mixture under a partial vacuum or in a chamber in which a partial vacuum is maintained, as will be hereinafter more fully set forth and described.

More particularly the invention pertains to a process for freezing ice cream or the like wherein the freezer for whipping air into the mix and freezing it to a semi-plastic state is so arranged or constructed as to be capable of continuously delivering such semi-plastic mix with the proper overrun into a hardening room or chamber upon a conveyor or freezing surface or the like such as will continuously convey or advance the mix within or through the chamber while it gradually becomes hardened through the medium of the low degree of temperature, whereby it may be continuously delivered from said hardening room for use, thus greatly facilitating the rapidity with which ice cream or the like may be manufactured.

Thus the mix may be delivered onto a continuously moving conveyor within the hardening chamber from either one or more batteries of freezers, the conveyor being of such character that the semi-frozen mix is hardened through contact with the cold surface thereof or the low temperature of the air through which it passes, in some instances the refrigerant being on one side of the conveyor surface while the semi-frozen aerated mix on the other side thereof.

Figure 2:
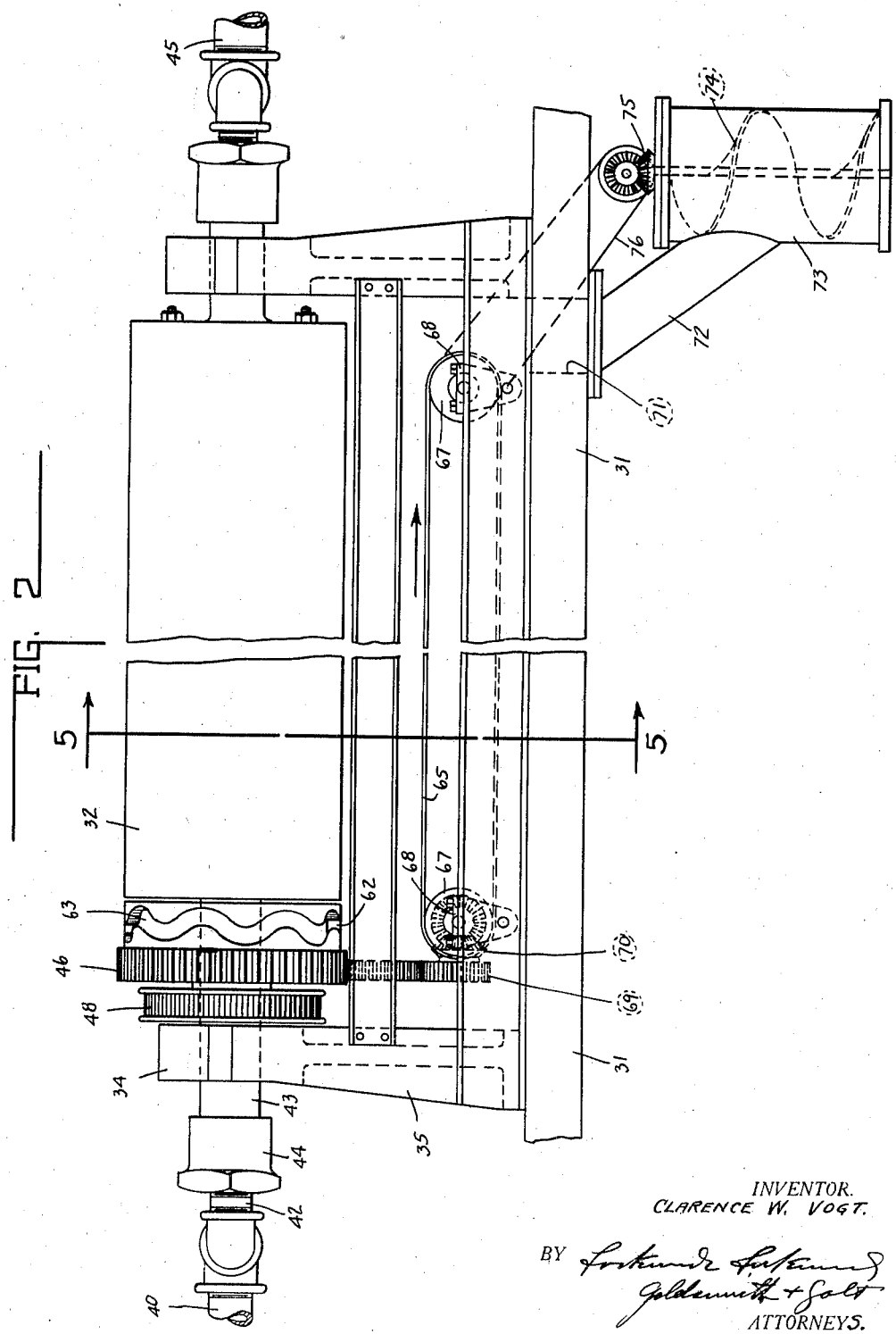
Figure 3:
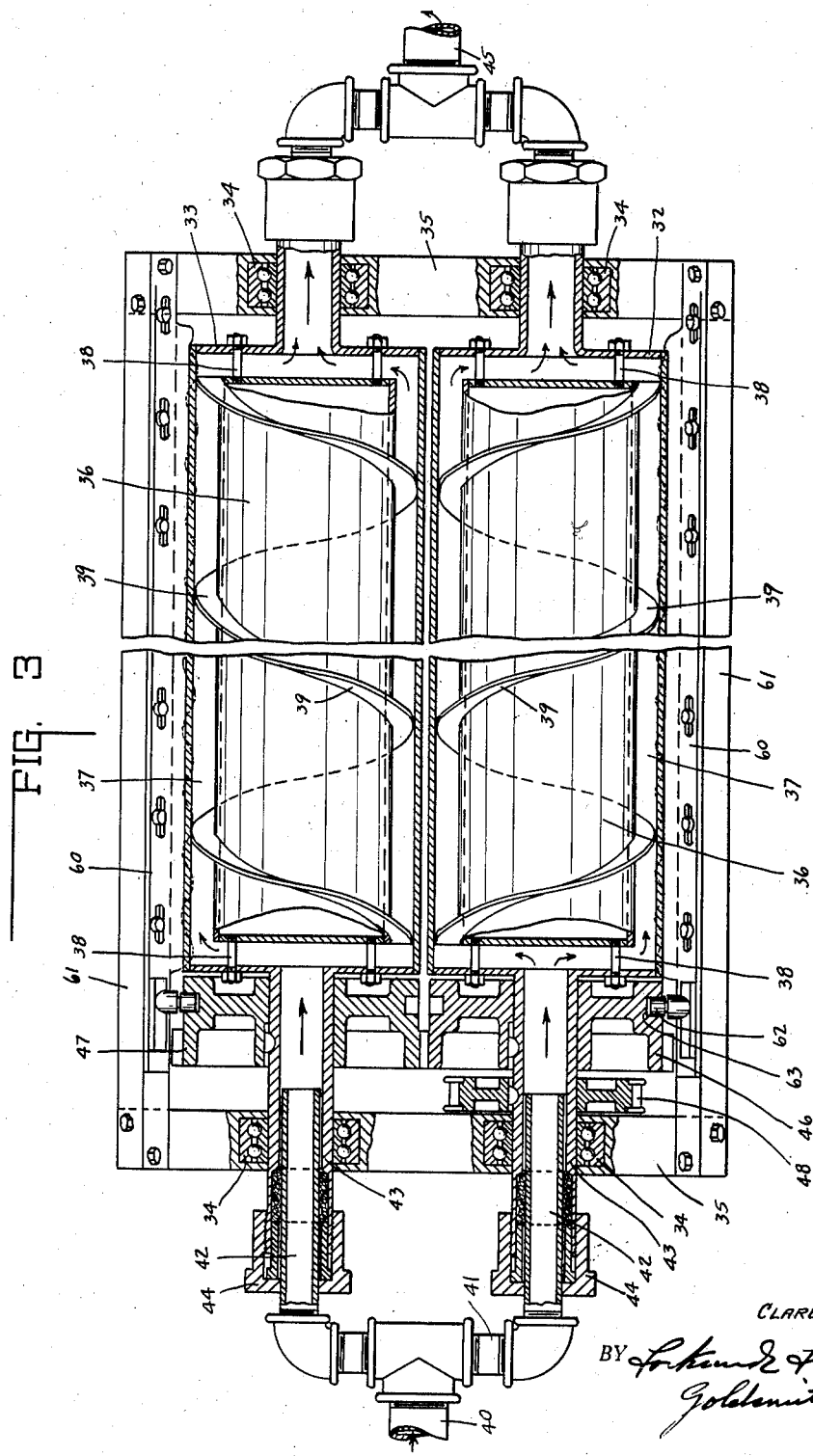

Other features and advantages of this machine and the process employed thereby will be more specifically pointed out and become apparent from the accompanying drawings and the following description and claims:

In the drawings, Figure 1 is a side elevation showing the refrigerating room in section. Fig. 2 is an enlarged view showing a side elevation of the refrigerating rolls with the central portion thereof broken away. Fig. 3 is the same as Fig. 2, showing a plan view thereof with parts illustrated in cross section. Fig. 4 is an end elevation of the rolls. Fig. 5 is a section taken on the line 5—5 of Fig. 2.

In the drawings, there is shown an ice cream freezer of the heavy duty commercial type, comprising a driving motor 10, gear housing 11, base 12, freezing chamber 13 and batch weigher reservoir 14. On the end of the chamber 13 there is a handle 15 for controlling the discharge valve 16. The above-described freezer is of a common type in commercial use and well known to the trade as being adapted to partially freeze the mix to a semi-plastic state incorporating therein the desired percentage of air by whipping or aerating the same.

Immediately below the freezer there is provided a receptacle 17 which is supported on a scale platform 18, said receptacle being adapted to receive a batch of semi-frozen mixture as it is discharged from the freezer. The scale platform 18 is connected in the usual manner with the scale beam 20 provided with an adjusting weight 21 and the removable weights 22. The lower end of the receptacle 17 is in open communication with a vacuum delivery pipe 23, the same being controlled by a valve 24. Said valve is connected with a double solenoid 25, which, in turn, has its opposed coils connected in the usual manner with a source of current, while the other terminals of the respective coils are connected through the wires 26 with a contact on top of the beam 20 and one on the lower side thereof respectively. The source of current is connected with the scale, whereby a current is directed through the upper solenoid for lifting and opening the valve when a batch of mixture is dropped into the receptacle 17 sufficient to cause the end of the beam to be raised so that contact will be made by the top thereof, and a reverse action for closing the valve will be caused by the energizing of the lower reverse solenoid upon the mixture being withdrawn from the receptacle so as to relieve the weight and allow the beam to drop down, making contact through the lower side thereof. However, various other means for controlling a valve may be employed, such as to cause the valve to close when there is no pressure to be drawn therethrough, and opened when the mixture is received by the receptacle. The purpose of this arrangement is to provide a continuous source of supply to the hardening chamber to permit of continuous hardening of the semi-plastic mix.

Adjacent the freezer there is a refrigerating room or chamber formed by the walls 30 and properly insulated in the usual manner to retain the cold air, said chamber being maintained at a low temperature through the medium of the usual refrigerating system of brine pipes 30ª. Positioned near the top of the chamber there is a platform 31 upon which the refrigerating rolls are mounted. As shown in Fig. 3, there are provided two rolls 32 and 33, rotatably supported by the bearings 34 in the standards 35.

The rolls comprise an outer drum and inner drum 36 spaced therefrom so as to provide an annular refrigerant chamber 37 as shown in Figs. 3 and 5, the drums 36 being entirely closed to prevent any entrance therein of the refrigerating brine, and being rigidly secured to the ends of the rolls by the bolts 38. Surrounding the drums 36 there are spiral vanes 39 which extend from the drums 36 to the inner surface of the outer peripheries of the rolls. The chamber 37 is in communication with the brine pipe 40, leading from any suitable source of supply of the usual character. Brine is permitted to pass from the pipe through a header 41 which is in communication with both rolls 32 and 33 and through the pipes 42 which extend into the hollow spindles 43 mounted in the bearings 34, the connection therebetween having a suitable packing box 44 so as to permit relative rotation therebetween. The brine is forced in under sufficient pressure to cause it to be guided about the periphery of the drum 36 by the vanes 39 and discharged through the other end of each of the rolls which communicate with an outlet 45 in the same manner as above described with respect to the connection with the inlet 40. By reason of this arrangement, each of the rolls is cooled to a low degree of temperature, sufficient for causing the semi-frozen mixture which may come in contact with the surface thereof to be almost instantly frozen to solidity.

Each roll is provided on its end with suitable gears 46 and 47, shown in Fig. 4, one of said gears having associated therewith, as shown in Figs. 2 and 3, a belt-driven pulley 48 which may be driven by a belt 49 through the reduction gears 50 by a motor 51, as shown in Fig. 1. By means of suitable reduction gearing 51, the speed of rotation of the rolls may be controlled for the purpose which will be hereinafter described. It will further be noted that the rolls will rotate in opposite directions as will be indicated by the arrows in Fig. 5.

Mounted directly over the rolls there is a discharge header or manifold 55 which is connected with the delivery pipe 23 through a central T-connection 56. The manifold is well insulated by the insulating packing 57, as shown in Figs. 4 and 5, and is supported from the top of the chamber by the hangers 58. Communicating with the manifold 55 there is a plurality of laterally-directed discharge nozzles 59 adapted to discharge the plastic mixture directly over the top of the refrigerating rolls, as shown in Fig. 5, throughout substantially the whole length thereof. Upon the mixture being distributed over the top surface of the rolls and coming in contact therewith in a comparatively thin film, the extremely low temperature of the surface causes the same to be frozen and solidified thereon. This action causes the mixture to adhere to the surface in its frozen state and be carried thereby past the point of nearest approach of the two cylinders. In this connection, it will be noted that the cylinders are spaced apart a given distance equal to double the desired thickness of the coating so that any excess mixture will be spread over the surface of the rolls, whereby the thickness of the coating will not be such as to prevent complete solidification.

In order to prevent untimely freezing of the mixture about the ends of the nozzles 59, where they approach the cold surface of the rolls 32 and 33, there are inserted adjacent thereto electrically-heated resistance wires 57$^a$ within the insulating material and directly adjacent the metal nozzle.

As the frozen mixture is carried about the rolls, it is removed therefrom by the knives 60, which are positioned as shown in Figs. 3 and 5, on opposite sides of the rolls and supported on the side brackets 61. The knives are so supported as to permit them to be reciprocated longitudinally of the support, and are provided with a scalloped knife edge, shown in dotted lines in Fig. 3, so as to rather cut the frozen mixture from the rolls than scrape it therefrom. A reciprocatory action is imparted to the knives by reason of the projection 62 secured thereto engaging in a cam 63 formed integral with the gears 46 and 47, as best illustrated in Figs. 2 and 3.

It will be seen that the cylinder walls act as conveyors to carry the material from the delivery nozzles to the knives or scrapers, that is, they continuously advance it while it is being hardened from the semi-frozen condition in which it existed at the nozzles, to a more nearly solid condition. As the material is of no great thickness the hardening action is quickly effected. With the conveying surface also acting as a freezing surface, there is a rapid heat transfer from the material on one side of the conveyor to the brine on the other side.

As shown in Fig. 5, the frozen and solidified layer or coating of the mixture will thus be cut from the surface of the rolls and caused to drop upon a conveying belt 65, the sides of the belt being covered by the deflecting plates 66. The belt is mounted upon the rollers 67 which are rotatably supported in the brackets 68, and rotated through the medium of a gear 69 meshing with the gear 46 and the bevel gears 70. As the material is caused to drop from the surface of the hardening rolls onto the conveyor belt 65 it is advanced by said belt through the chamber while the hardening process continues due to the action of the extremely cold air in the hardening room which is cooled to a low degree by the pipes 30$^a$ and cylinders 32 and 33. Thus, there is illustrated herein two means of hardening the material, one means consisting of the refrigerating surface which advances the material within the chamber as in the case of the cylinders 32 and 33, while the other means consists of the conveyor belt which advances the material within said chamber while it is hardened by the low temperature of the air contained therein. The belt travels in the direction of the arrow, as shown in Fig. 2, and dumps the material through an opening 71 in the supporting platform 31, said opening being in direct communication with a discharge spout 72 which carries it into the feeding and compression chamber 73. The chamber 73 is provided with a screw feed 74 driven through the medium of suitable gears 75 and a belt 76 driven from the adjacent roller 67.

The feeding and compression chamber 73 is so arranged as to permit the attachment therewith of a mold or container 77 for receiving the mixture in its final frozen and solid state. Such container may be in the form of a commercial ice cream can into which the frozen ice cream is forced and packed by the feed screw, or it may be in the form of a mold for forming it to the desired shape, after which it may be discharged onto a conveyor belt 78 to carry it from the chamber. The timing of the whole apparatus may be such that the discharge of the batch from the freezer will cause a steady flow of the proper amount of mixture to the freezing rolls, so that the container or mold 77 will be packed under compression at given intervals of time, after which it will be replaced by an empty container, this feature of packing not forming a part of this invention.

In operation, a vacuum is maintained in the upper compartment of the chamber 30. As shown herein the vacuum pump 80 is mounted in the lower compartment, which is in communication with the upper compartment through the vacuum line 79. A discharge outlet 81 is provided in the lower compartment, whereby partial vacuum will be maintained in the upper compartment, but the discharge of the cold air drawn therefrom in producing a vacuum will be discharged in the lower compartment so that there will be no material loss in refrigeration. A suitable motor or source of power for driving the vacuum pump 80 may be mounted outside of the chamber or room so that no heat will be generated therein from such motor. By reason of the vacuum created thereby, the semi-frozen and plastic mixture discharged into the receptacle 17 will be drawn by suction through the delivery pipe 23 and out of the nozzles 59 of the manifold. While it would be feasible to deliver the semi-frozen and plastic mixture to the freezing rolls under pressure rather than by suction, or in other ways, whereby it will be discharged thereover, the delivery thereof by vacuum has certain advantages in that the mixture instead of being unduly compressed before freezing, is expanded so as to maintain the mixture in more uniform condition. This is of importance, since the compression of the mixture in its semi-frozen state substantially decreases its bulk whereas suction increases the bulk.

Upon the mixture being discharged over the surface of the freezing rolls, the exceedingly low temperature thereof will immediately cause the same to be frozen into a substantially solid state and will carry it around until it is cut from the rolls by means of the reciprocating knives 60. As the frozen and substantially solid particles of mixture are caused to drop on the belt in a flake-like formation, the belt carries them to the discharge opening where they pass into the conveying and compressing chamber. As the frozen or solidified mixture in its flake-like form is fed into its final container or form, it may be compressed and forced into a compact solid mass. It will be noted that the compression that takes place at the end of the operation, occurs after the mixture reaches its final frozen state, rather than while in the semi-frozen and plastic form, which is the proper time for compressing and packing the same.

The mixture is then ready for commercial use, excepting for such mechanical operations as may be desired for the particular packing and treatment of the same, and the necessity of permitting it to become frozen in the usual manner as heretofore described, is thus eliminated.

This makes possible a continuous process in the manufacture of ice cream, ices or other frozen liquids or confections without the delay heretofore necessary, and further has certain advantages in the packing and handling thereof as heretofore described.

With respect to the container 77, into which the mixture, in its flake-like frozen form, is finally packed, such container may be in the form of a mold or the like for use in the manufacture of small ice cream bricks, cakes or fancy designs. Furthermore, such deposit into a suitable container need not necessarily be done in the cold room, but may be done in a warmer room, with more comfort, by causing the mixture to pass through the wall of the cold room, as will be obvious. Furthermore, with respect to the freezing of ices and the like, the mixture may be directly spread or sprayed upon the freezing rolls in its liquid form without previously having been mixed and partially frozen into a semi-frozen plastic form.

The invention claimed is:

1. The process of freezing a substance of the character described, consisting in first mixing a batch, conducting said mixture by vacuum and spreading the same over a freezing surface maintained at a low degree of temperature, whereby said mixture will be frozen into a substantially solid state, and thereafter removing said solidified mixture from said surface and delivering the same to a suitable container.

2. The process of freezing a substance of the character described, including partially freezing the same into a semi-plastic state, and conveying such substance to a freezing and hardening chamber maintained under a partial vacuum.

3. The process of freezing and hardening a substance of the character described, consisting in first incorporating in the substance a quantity of air to obtain the desired over-run and thereafter hardening the same while maintained under a partial vacuum.

4. The process of freezing and hardening a substance of the character described, consisting in first incorporating in the substance a quantity of air to obtain the desired over-run and thereafter hardening the same by delivering it onto a freezing surface while maintained under a partial vacuum.

5. The process of freezing and hardening a substance of the character described, consisting in providing a freezing surface maintained at a low degree of temperature, and conducting to and discharging onto said surface the substance to be hardened after it has been partially frozen in a semi-plastic state with a quantity of air incorporated therewith for obtaining the desired over-run whereby such aerated substance will become frozen to a hardened state with the air incorporated therein.

6. The process of freezing and hardening a substance of the character described, consisting in first partially freezing the substance to a semi-plastic condition while whipping air therein to obtain the desired over-run and thereafter conducting said substance to a freezing surface and discharging it thereon in a thin layer while retaining said surface at a low degree of temperature whereby it will become frozen to a hardened state with the air incorporated therein.

7. The process of freezing and hardening a substance of the character described, consisting in first partially freezing the substance to a semi-plastic condition while whipping air therein to obtain the desired over-run, conducting said substance to a freezing surface and discharging it thereon in a thin layer while retaining said surface at a low degree of temperature whereby it will become frozen to a hardened state with the air incorporated therein, and thereafter scrape the hard layer from said surface.

8. The process of freezing and hardening a substance of the character described, consisting in first partially freezing the substance to a semi-plastic condition while whipping air therein to obtain the desired over-run and thereafter conducting said substance to a hardening chamber maintained at a low degree of temperature, and discharging the substance upon a freezing surface within said chamber in a thin layer, whereby the layer of substance will become hardened thereon.

9. The process of freezing and hardening a substance of the character described, consisting in maintaining a freezing conveyor at a low degree of temperature, and conducting to and discharging thereon the substance to be hardened after it has been partially frozen in a semi-plastic state with a quantity of air incorporated therewith for obtaining the desired overrun whereby such aerated substance will become frozen to a substantially hardened state.

10. The process of freezing a substance of the character described, consisting in whipping air into a mix while partially freezing it to a semi-plastic state, delivering said mix in its semi-plastic state to a hardening chamber, and continuously advancing it therethrough while maintaining said chamber at a low degree of temperature whereby said mix will become frozen to a substantially hardened state while advancing therethrough.

11. The process of freezing a substance of the character described, consisting in whipping air into a mix while partially freezing it to a semi-plastic state, continuously delivering said mix in its semi-plastic state to a hardening chamber, and advancing said mix within said chamber while subjecting the same to the action of a low temperature whereby it will be substantially hardened therein.

12. The process of freezing a substance of the character described, consisting in whipping air into a mix while partially freezing it to a semi-plastic state, delivering said mix in its semi-plastic state to a hardening chamber maintained at a low degree of temperature, and advancing said mix within said chamber while subjecting it to the low temperature thereof for causing the same to be further frozen to a substantially hardened condition.

13. A process of freezing a substance of the character described consisting in partially freezing the same under agitation to a semi-plastic condition and thereafter transporting the semi-plastic substance upon a freezing surface for causing the same to be frozen into a solid state.

14. The process of freezing a substance of the character described consisting in partially freezing it to a semi-plastic state, delivering the same in its semi-plastic state to a hardening chamber maintained at a low degree of temperature and advancing said mix within said chamber while subjecting it to a low temperature for causing the same to be further frozen to a substantially hardened condition.

15. A process of freezing and hardening a material of the character described, including simultaneously agitating the substance and freezing a portion of the water content thereof and thereafter advancing the partially frozen substance in a quiescent state while subjecting it to a low temperature to freeze a further portion of the water content and deliver a hardened product.

16. The process of freezing and hardening a substance of the character described, which includes delivering to a hardening chamber said substance in a partially frozen, semi-plastic state, with air incorporated therein, maintaining a partial vacuum in said chamber whereby the air in said substance is caused to expand to increase the bulk of the substance, and maintaining said chamber at a low temperature, whereby said partially frozen substance is hardened in its expanded condition.

17. The process of freezing and hardening a substance of the character described, including forming a partially frozen mix with air whipped therein to give an overrun, delivering said partially frozen mix to a hardening chamber by means of a partial vacuum, whereby the incorporated air is caused to expand and increase the bulk of said partially frozen mix, and maintaining said chamber at a low temperature to harden the semi-frozen mix in its expanded condition.

18. The process of freezing and hardening a substance of the character described, including forming a partially frozen mix with air incorporated therein, reducing the pressure on the mix, and refrigerating the partially frozen mix under reduced pressure to harden it.

In witness whereof, I have hereunto affixed my signature.

CLARENCE W. VOGT.